(12) United States Patent
Edo et al.

(10) Patent No.: US 11,886,221 B2
(45) Date of Patent: Jan. 30, 2024

(54) IMAGE SYSTEM

(71) Applicant: InnoLux Corporation, Miao-Li County (TW)

(72) Inventors: Keiko Edo, Miao-Li County (TW); Naoki Sumi, Miao-Li County (TW); Hao-Yu Liou, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 17/895,092

(22) Filed: Aug. 25, 2022

(65) Prior Publication Data

US 2022/0413645 A1    Dec. 29, 2022

Related U.S. Application Data

(63) Continuation of application No. 17/214,957, filed on Mar. 29, 2021, now abandoned.

(51) Int. Cl.
| | |
|---|---|
| *G06F 3/041* | (2006.01) |
| *G06F 3/01* | (2006.01) |
| *G06F 3/044* | (2006.01) |
| *G06F 3/042* | (2006.01) |
| *G02B 30/56* | (2020.01) |

(52) U.S. Cl.
CPC .......... *G06F 3/0412* (2013.01); *G02B 30/56* (2020.01); *G06F 3/012* (2013.01); *G06F 3/013* (2013.01); *G06F 3/016* (2013.01); *G06F 3/042* (2013.01); *G06F 3/044* (2013.01)

(58) Field of Classification Search
CPC ........ G06F 3/0314; G06F 3/012; G06F 3/013; G06F 3/016; G06F 3/042; G06F 3/044; G06F 3/0412; G02B 30/56
See application file for complete search history.

(56) References Cited

U.S. PATENT DOCUMENTS

| | | | | |
|---|---|---|---|---|
| 8,508,347 | B2 * | 8/2013 | Pihlaja | G06F 3/04815 340/407.2 |
| 8,692,777 | B2 * | 4/2014 | Staton | G06F 3/0412 324/519 |
| 9,477,317 | B1 * | 10/2016 | Clements | G06F 3/017 |
| 10,317,691 | B2 * | 6/2019 | Raymond | G02B 17/002 |
| 10,574,977 | B2 * | 2/2020 | Kaneda | G02B 5/124 |
| 11,069,044 | B1 * | 7/2021 | Hodge | G06T 11/60 |
| 11,119,263 | B2 * | 9/2021 | Craig | G02B 6/0036 |
| 11,143,794 | B2 * | 10/2021 | Zhang | G02B 3/00 |
| 11,194,402 | B1 * | 12/2021 | Yang | G02B 30/26 |

(Continued)

FOREIGN PATENT DOCUMENTS

| | | | | | |
|---|---|---|---|---|---|
| CA | | 2697241 A1 * | 2/2008 | ....... | B29D 11/00596 |
| CN | | 113625901 A * | 11/2021 | ............ | G06F 3/016 |

(Continued)

*Primary Examiner* — Ricardo Osorio
(74) *Attorney, Agent, or Firm* — Winston Hsu

(57) ABSTRACT

An image system is provided by the present disclosure. The image system includes a display device displaying at least one floating image layer on a top surface of the display device and a frame disposed on the display device and partially exposing the top surface of the display device, wherein the frame has a height with reference to the top surface of the display device. The at least one floating image layer is aligned with a top surface of the frame in a direction parallel to a height direction of the frame.

15 Claims, 5 Drawing Sheets

(56) References Cited

U.S. PATENT DOCUMENTS

| | | | | |
|---|---|---|---|---|
| 2001/0022562 | A1* | 9/2001 | Ishikawa | G09G 3/003 345/9 |
| 2004/0130506 | A1* | 7/2004 | Ishikawa | H04N 13/305 345/32 |
| 2004/0217920 | A1* | 11/2004 | Ishikawa | G03B 35/24 345/32 |
| 2010/0097447 | A1* | 4/2010 | Tomisawa | G02B 30/56 348/51 |
| 2010/0110384 | A1* | 5/2010 | Maekawa | G03B 35/18 353/10 |
| 2010/0245345 | A1* | 9/2010 | Tomisawa | H04N 13/393 345/419 |
| 2010/0315413 | A1* | 12/2010 | Izadi | G06F 3/0425 345/419 |
| 2011/0096024 | A1* | 4/2011 | Kwak | G06F 3/0445 345/174 |
| 2011/0164029 | A1* | 7/2011 | King | G06T 19/00 345/173 |
| 2011/0179368 | A1* | 7/2011 | King | G06F 3/0482 715/850 |
| 2012/0212429 | A1* | 8/2012 | Okura | A63F 13/42 345/173 |
| 2013/0125436 | A1* | 5/2013 | Vallar | A47G 1/06 40/714 |
| 2014/0248446 | A1* | 9/2014 | Vallar | A47G 1/065 428/14 |
| 2014/0283425 | A1* | 9/2014 | Vallar | A47G 1/0616 40/745 |
| 2015/0258014 | A1* | 9/2015 | Pascal, Sr. | A61K 8/922 424/744 |
| 2016/0128496 | A1* | 5/2016 | Vallar | A47G 1/0633 40/768 |
| 2016/0219270 | A1* | 7/2016 | Chen | G06F 3/0412 |
| 2016/0364836 | A1* | 12/2016 | Sumi | G02B 30/56 |
| 2016/0370595 | A1* | 12/2016 | Sumi | G02B 30/31 |
| 2017/0261758 | A1* | 9/2017 | Powell | H04N 13/128 |
| 2018/0039090 | A1* | 2/2018 | Haruyama | G02B 5/3025 |
| 2018/0063520 | A1* | 3/2018 | Chung | H04N 13/346 |
| 2019/0094996 | A1* | 3/2019 | Kim | G06F 3/0346 |
| 2019/0243527 | A1* | 8/2019 | Kuribayashi | G06F 3/04817 |
| 2019/0362556 | A1* | 11/2019 | Ben-Dor | G06T 19/006 |
| 2020/0142569 | A1* | 5/2020 | Wu | G06F 3/0481 |
| 2020/0213433 | A1* | 7/2020 | Griffith | G03B 21/10 |
| 2021/0213832 | A1* | 7/2021 | Yamamoto | G06V 10/25 |

FOREIGN PATENT DOCUMENTS

| | | | | |
|---|---|---|---|---|
| EP | 3101334 A1 | * | 12/2016 | ........... B60Q 1/0408 |
| JP | WO2008149424 A1 | * | 8/2010 | |
| WO | WO-2005025388 A2 | * | 3/2005 | ........... A47G 1/0605 |
| WO | WO-2008126273 A1 | * | 10/2008 | ......... G02B 27/2292 |
| WO | WO-2015040873 A1 | * | 3/2015 | ........... G02B 1/041 |
| WO | WO-2017130290 A1 | * | 8/2017 | ........... B60K 35/00 |

* cited by examiner

IMAGE SYSTEM

CROSS REFERENCE TO RELATED APPLICATIONS

This application is a continuation application of U.S. application Ser. No. 17/214,957, filed on Mar. 29, 2021. The content of the application is incorporated herein by reference.

BACKGROUND OF THE DISCLOSURE

1. Field of the Disclosure

The present disclosure relates to an image system, and more particularly to an image system that can display floating image.

2. Description of the Prior Art

Floating image systems capable of displaying floating images have become one of the topics in the electronic technology recently. As the demands of the consumers to the floating image system are getting higher, to improve the quality of the floating image displayed by the floating image system is one of the directions of the development in the related field.

SUMMARY OF THE DISCLOSURE

One of the purposes of the present disclosure is to provide an image system having a display device displaying a floating image layer and a frame disposed on the display device, wherein the three dimensional effect of the floating image layer observed by the users may be improved by the frame.

In some embodiments, an image system is provided by the present disclosure. The image system includes a display device displaying at least one floating image layer on a top surface of the display device and a frame disposed on the display device, wherein the frame has a height with reference to the top surface of the display device. The at least one floating image layer is aligned with a top surface of the frame in a direction parallel to a height direction of the frame.

These and other objectives of the present disclosure will no doubt become obvious to those of ordinary skill in the art after reading the following detailed description of the embodiment that is illustrated in the various figures and drawings.

DETAILED DESCRIPTION

The present disclosure may be understood by reference to the following detailed description, taken in conjunction with the drawings as described below. It is noted that, for purposes of illustrative clarity and being easily understood by the readers, various drawings of this disclosure show a portion of the electronic device. In addition, the number and dimension of each element shown in drawings are only illustrative and are not intended to limit the scope of the present disclosure.

Certain terms are used throughout the description and following claims to refer to particular elements. As one skilled in the art will understand, electronic equipment manufacturers may refer to an element by different names. This document does not intend to distinguish between elements that differ in name but not function.

In the following description and in the claims, the terms "include", "comprise" and "have" are used in an open-ended fashion, and thus should be interpreted to mean "include, but not limited to . . . ".

It will be understood that when an element or layer is referred to as being "on/above" or "connected to" another element or layer, it can be directly on or directly connected to the other element or layer, or intervening elements or layers may be presented (indirectly). In contrast, when an element is referred to as being "directly on" or "directly connected to" another element or layer, there are no intervening elements or layers presented.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

Figure 1:
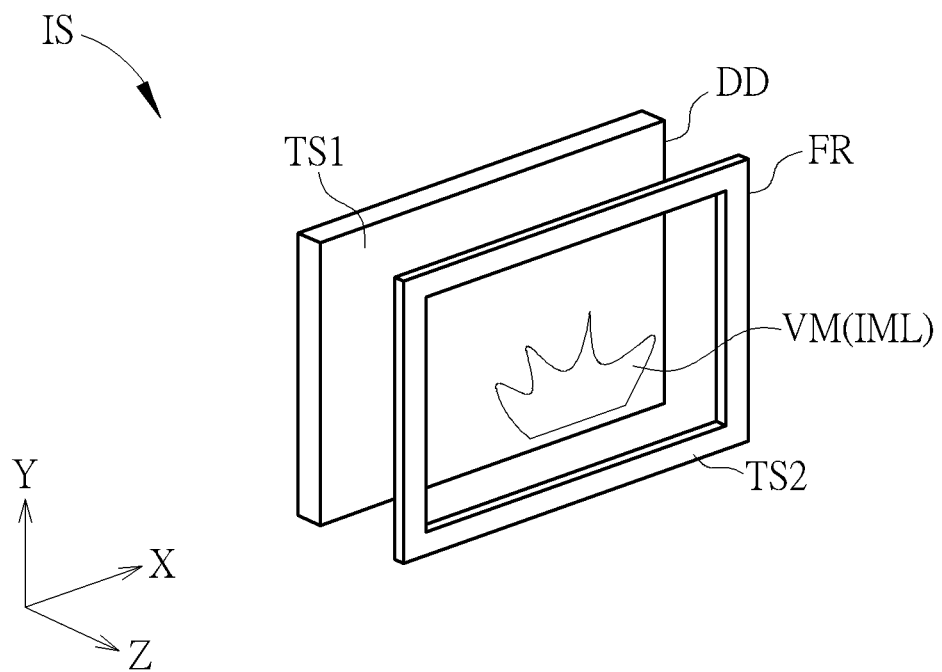
FIG. 1 schematically illustrates an exploded view of an image system according to a first embodiment of the present disclosure.
Figure 2:
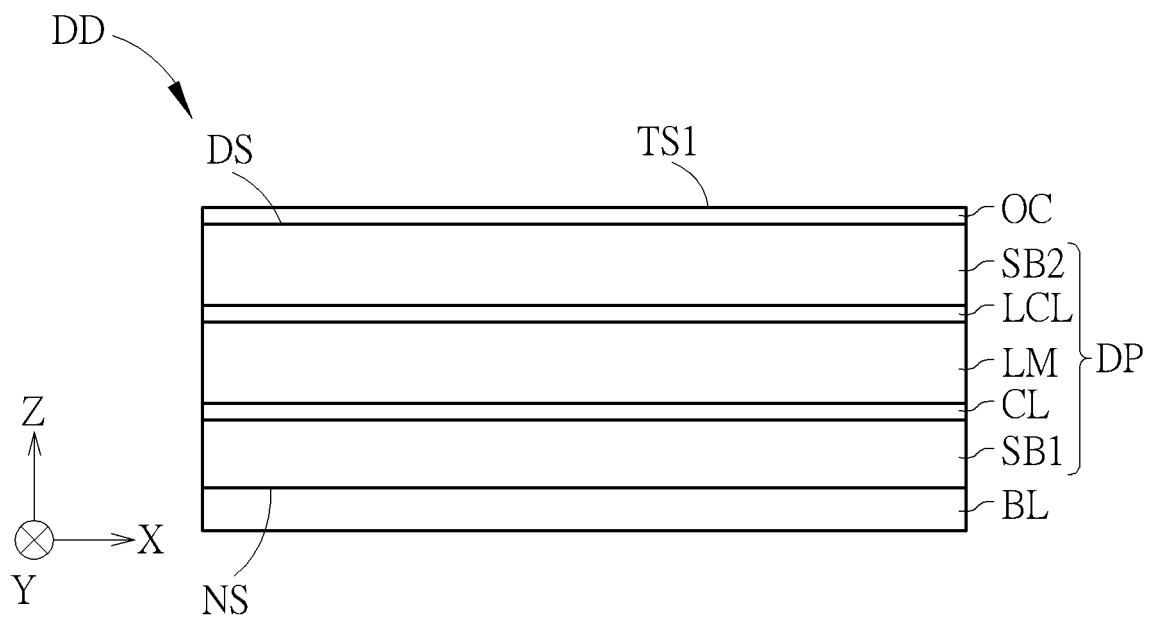
FIG. 2 schematically illustrates a cross-sectional view of a display panel of the image system according to the first embodiment of the present disclosure.

Referring to FIG. 1 and FIG. 2, FIG. 1 schematically illustrates an exploded view of an image system according to a first embodiment of the present disclosure, and FIG. 2 schematically illustrates a cross-sectional view of a display panel of the image system according to the first embodiment of the present disclosure. In order to simplify the figure, the display device DD is shown as a single layer in FIG. 1, and the detailed structure of the display device DD may refer to the structure shown in FIG. 2 in the following, but not limited thereto. According to the present disclosure, the image system IS may for example be applied to common displays, tiled displays, vehicle displays, touch displays, television, smart phones, tablets, augmented reality displays, virtual reality displays, medical displays or electronic devices of the above-mentioned products, but not limited thereto. In the present embodiment, the image system IS shown in FIG. 1 may include a display device DD, wherein the display device DD of the present disclosure may display at least one floating image layer IML, but not limited thereto. The display device DD that displays one floating image layer IML in the first embodiment is taken as an example for description, but the present disclosure is not limited thereto. In some embodiments, the display device DD of the image system IS may display a plurality of floating image layers IML. In detail, as shown in FIG. 1, the display device DD of the present embodiment may display a floating image layer IML on a top surface TS1 of the display device DD, or in other words, the display device DD may display the floating image layer IML having a floating image VM, but not limited thereto. The top surface TS1 of the display device DD mentioned above may be defined as the outermost surface (or the output surface of the light) of the display device DD in the present embodiment, but not limited thereto. The floating image layer IML of the present embodiment may for example be a virtual layer showing the position of the floating image VM. In the present embodiment, as shown in FIG. 1, the floating image layer IML may for example be a flat layer, but the present embodiment is not limited thereto. In detail, as shown in FIG. 1, the floating image layer IML may be a flat layer parallel to the top surface TS1 (such as the x-y plane) of the display device DD, but not limited thereto. In some embodiments, the floating image layer IML may include any suitable shape according to the demands of the design of the display device DD, and the present disclosure is not limited thereto. The detail of the display device DD will be described in the following.

As shown in FIG. 2, the display device DD of the present embodiment may include a display panel DP, but not limited thereto. In the present embodiment, the display panel DP may for example include an inorganic light emitting diode display panel, an organic light emitting diode display panel, a liquid crystal display panel or other suitable types of display panel, but not limited thereto. For example, the display panel DP shown in FIG. 2 may be a liquid crystal display panel and include a first substrate SB1, a circuit layer CL, a light modulating layer LM, a light converting layer LCL and a second substrate SB2, but not limited thereto. The display device DD may further include a backlight module BL served as the light source of the display panel DP, but not limited thereto. The first substrate SB1 and the second substrate SB2 may be a rigid substrate or a flexible substrate respectively, wherein the rigid substrate may include glass, quartz, sapphire, ceramic, other suitable materials or the combinations of any the above-mentioned materials, and the flexible substrate may include polyimide (PI) substrate, polycarbonate (PC) substrate, polyethylene terephthalate (PET) substrate, other suitable substrates or the combinations of the above-mentioned substrates, but not limited thereto. The light modulating layer LM may include liquid crystal molecules. The circuit layer CL may include driving elements and/or switching elements such as transistors, wherein the driving elements/or switching elements of the circuit layer CL may control the rotation or motion of the liquid crystal molecules in the light modulating layer LM, but not limited thereto. The light converting layer LCL may include any suitable material capable of converting or filtering the color and/or the wavelength of the light emitted from the backlight module BL. For example, the light converting layer LCL may include color filters, but not limited thereto. It should be noted that the elements and/or the layers included in the display panel DP of the present disclosure are not limited to what is shown in FIG. 2, and the display panel DP may further include other suitable elements or layers. In addition, the structure of the display panel DP shown in FIG. 2 is exemplary, and the property of each of the layers and/or the elements of the display panel DP of the present embodiment is not limited thereto. In some embodiments, when the display panel DP is a light emitting diode display panel, the display panel may include a light emitting layer having light emitting elements, wherein the light emitting elements may for example include light emitting diode (LED), organic light emitting diodes (OLED), mini light emitting diodes (mini LED), micro light emitting diodes (micro LED), other types of light emitting diodes or the combinations of the above-mentioned light emitting diodes, but not limited thereto.

In the present embodiment, as shown in FIG. 2, the display device DD of the present embodiment may selectively further include an optical component OC disposed on the display panel DP. In detail, the optical component OC may be disposed on the displaying surface DS of the display panel DP. According to the present embodiment, the optical component OC may for example include a lenticular lens, a parallax barrier, a liquid crystal gradient index (GRIN) lens, a liquid crystal parallax barrier or other suitable materials, but not limited thereto. The optical component OC may change the path direction of the light emitted from the displaying surface DS of the display panel DP, such that the path directions of the lights pass through the optical component OC may be differed, and the images displayed by the display device DD may be three-dimensional when they are observed by the users, but not limited thereto. The structure of the display device DD mentioned above may be applied to each of the embodiments of the present disclosure, and will not be redundantly described in the following.

Figure 3:
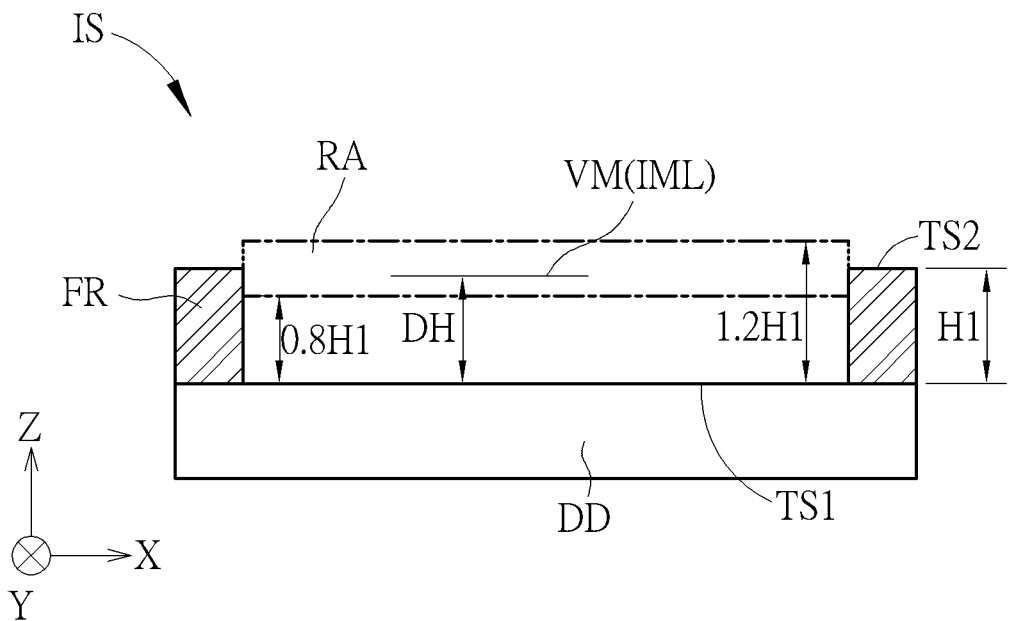
FIG. 3 schematically illustrates a cross-sectional view of the image system according to the first embodiment of the present disclosure.

Referring to FIG. 1 and FIG. 3, FIG. 3 schematically illustrates a cross-sectional view of the image system according to the first embodiment of the present disclosure. In order to simplify the figure, the display device DD is shown as a single layer in FIG. 3. According to the present embodiment, the image system IS may further include a frame FR in addition to the display device DD mentioned above, wherein the frame FR may be disposed on the display device DD, but not limited thereto. In detail, as shown in FIG. 3, the display device DD may include the top surface TS1, and the frame FR may be disposed on the top surface TS1 of the display device DD and partially expose the top surface TS1, i.e., the frame FR may be located directly or indirectly on the top surface TS1. As mentioned above, the top surface TS1 of the display device DD may be the outermost surface (or the output surface of the light) of the display device DD, that is, the top surface TS1 of the display device DD may for example be the top surface of the optical component OC shown in FIG. 2 when the display device DD include the optical component OC as its top element, but not limited thereto. The frame FR of the present embodiment may be formed of any suitable material according to the design and the use of the image system IS, and the present disclosure is not limited thereto.

In the present embodiment, as shown in FIG. 3, the frame FR may have a height H1, wherein the height H1 of the frame FR may be defined as the distance between the top surface TS1 of the display device DD and the top surface TS2 of the frame FR in a normal direction of the top surface TS1 of the display device DD, such as the direction Z. The top surface TS2 of the frame FR may be defined as the surface of the frame FR away from the top surface TS1 of the display device DD, but not limited thereto. As shown in FIG. 3, when the frame FR is directly disposed on the display device DD, the height H1 of the frame FR may be substantially equal to the thickness of the frame FR, but not limited thereto. In some embodiments, the frame FR and the display device DD of the image system IS may be separated, or in other words, the frame FR may be disposed on the display device DD indirectly. In such condition, the height H1 of the frame FR defined through the above-mentioned method may be greater than the thickness of the frame FR, but not limited thereto. The definition of the height H1 of the frame FR may be applied to each of the embodiments of the present disclosure. In some embodiments, the height H1 may be the maximum distance between the top surface TS1 and the top surface TS2, but not limited thereto.

Figure 4:
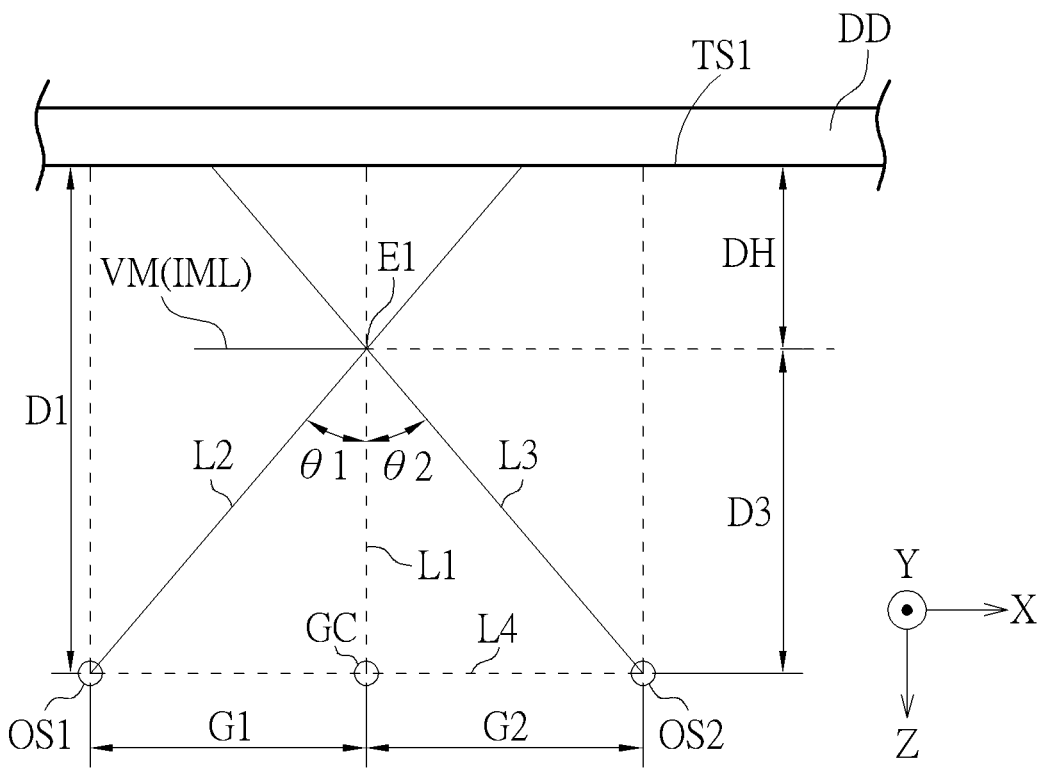
FIG. 4 schematically illustrates a measurement of a depth of a floating image layer according to the first embodiment of the present disclosure.

Referring to FIG. 4, FIG. 4 schematically illustrates a measurement of a depth of a floating image layer according to the first embodiment of the present disclosure. In order to simplify the figure, the display device DD is shown as a single layer in FIG. 4, but not limited thereto. According to the present embodiment, as shown in FIG. 4, the floating image layer IML may have a depth DH (also shown in FIG. 3) with reference to the top surface TS1 of the display device DD, or in other words, the depth DH of the floating image layer IML may be defined as the distance between the top surface TS1 and the floating image layer IML in the normal direction (such as the direction Z) of the top surface TS1 of the display device DD, but not limited thereto. In the present embodiment, the depth DH of the floating image layer IML may be calculated based on the edge of the floating image VM of the floating image layer IML, but not limited thereto. In detail, as shown in FIG. 4, an optical sensor OS1 may be disposed, and the floating image layer IML may be located between the optical sensor OS1 and the display device DD in the direction (direction Z) perpendicular to the normal direction of the top surface TS1 of the display device DD. The optical sensor OS1 may for example include a camera, but not limited thereto. The optical sensor OS1 may for example substantially focus on the edge (such as the edge E1, but not limited thereto) of the floating image VM, and a line segment L2 between the edge E1 of the floating image VM and the optical sensor OS1 may thereby be defined. Then, a point GC may be defined according to the edge E1 of the floating image VM and the position of the optical sensor OS1. In detail, the point GC may be defined as the intersection of the line (such as the line L1 shown in FIG. 4) along the normal direction (direction Z) of the top surface TS1 of the display device DD and passing through the edge E1 of the floating image VM and the line (such as the line L4) along the direction (direction X) substantially perpendicular to the normal direction of the top surface TS1 of the display device DD and passing through the optical sensor OS1, but not limited thereto. In addition, a viewing angle of the optical sensor OS1 may be defined according to the position of the optical sensor OS1. In detail, as shown in FIG. 4, after the line segment L2 and the line L1 are determined, the viewing angle θ1 of the optical sensor OS1 may for example be defined as the included angle of the line segment L2 and the line L1, but not limited thereto. According to the present embodiment, after the position of the optical sensor OS1 and the edge E1 is determined and the point GC and the viewing angle θ1 is defined, the depth DH of the floating image layer IML may be calculated. In detail, as shown in FIG. 4, after the point GC is defined, a distance G1 between the optical sensor OS1 and the point GC may be measured, and a distance D3 between the edge E1 of the floating image VM and the point GC can be calculated according to the distance G1 and the viewing angle θ1. For example, the relation between the distance D3, the distance G1 and the viewing angle θ1 may be shown in the following formula.

distance $D3$ = distance $G1$/tan $\theta 1$

After the distance D3 between the edge E1 and the point GC is calculated, the depth DH of the floating image layer IML may thereby be calculated. In detail, as shown in FIG. 4, a distance D1 may be between the optical sensor OS1 and the top surface TS1 of the display device DD, and after the distance D1 is measured or calculated, the depth DH of the floating image layer IML may be equal to the distance D1 minus the distance D3 (that is, DH=D1−D3). Therefore, through the above-mentioned method, the depth DH of the floating image layer IML may be calculated. It should be noted that the position of the optical sensor is not limited to the position of the optical sensor OS1. For example, as shown in FIG. 4, an optical sensor OS2 may be disposed, and a distance G2 between the point GC and the optical sensor OS2 and a viewing angle θ2 of the optical sensor OS2 may be defined. Therefore, the depth DH of the floating image layer IML may be calculated through the above-mentioned method. The definition and calculation method of the depth DH of the floating image layer IML may be applied to each of the embodiments of the present disclosure, and will not be redundantly described in the following. However, the calculation of the depth DH is not limited to above method. Any suitable calculation method of the depth DH may be adopted.

According to the present embodiment, as shown in FIG. 3, the top surface TS2 of the frame FR and the floating image layer IML may substantially be aligned with each other (in a direction parallel to a height direction of the frame FR, that is, the direction Z), that is, the height H1 of the frame FR may substantially be equal to the depth DH of the floating image layer IML, but not limited thereto. The definitions of the height H1 and the depth DH may refer to the above-mentioned contents. In the present embodiment, "the height H1 is substantially be equal to the depth DH" mentioned above represents that the depth DH of the floating image layer IML may range from 0.8 times to 1.2 times of the height H1 of the frame FR, i.e., 0.8*H1≤DH≤1.2*H1, such as 0.9*H1, or 1.1*H1, but not limited thereto. Alternatively, in other words, the floating image layer IML may be located in a range from "1 times of the height H1 adding +0.2 times of the height H1" to "1 times of the height H1 adding −0.2 times of the height H1" based on the top surface TS2 of the frame FR, i.e., DH=(1±0.2)*H1. For example, as shown in FIG. 3, the height H1 of the frame FR shown in FIG. 3 may be designed, such that the floating image layer IML may be located in a range RA, wherein the range RA may be within +0.2 times to −0.2 times of the height H1 of the frame FR based on the top surface TS2 of the frame FR, but not limited thereto. In some embodiments, the depth DH of the floating image layer IML may be equal to the height H1 of the frame FR, and the floating image layer IML can be said to be aligned with the top surface TS2 of the frame FR. The relationship between the height H1 of the frame FR and the depth DH of the floating image layer ILM mentioned above may be applied to each of the embodiments of the present disclosure.

In the present disclosure, the image system IS may include the display device DD displaying the floating image layer IML and the frame FR disposed on the top surface TS1 of the display device DD, wherein the floating image layer IML is substantially aligned with the top surface TS2 of the frame FR. Therefore, the frame FR may help the users to recognize the position of the floating image layer IML, such that the three dimensional effect of the floating image layer IML observed by the users may be improved by the frame FR. The visibility of the floating image VM may be improved, thereby improving the viewing experience of the users.

More embodiments of the present disclosure will be described in the following. In order to simplify the description, the same layers or elements in the following embodiments would be labeled with the same symbol, and the features thereof will not be redundantly described. The differences between each of the embodiments will be described in detail in the following contents.

Figure 5:
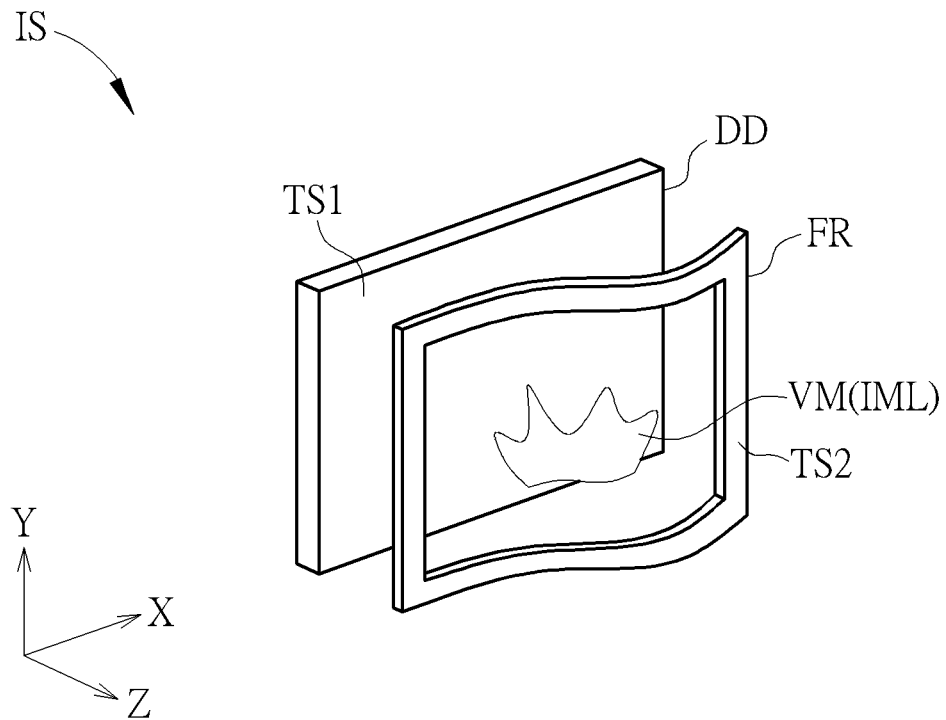
FIG. 5 schematically illustrates an exploded view of an image system according to a second embodiment of the present disclosure.
Figure 6:
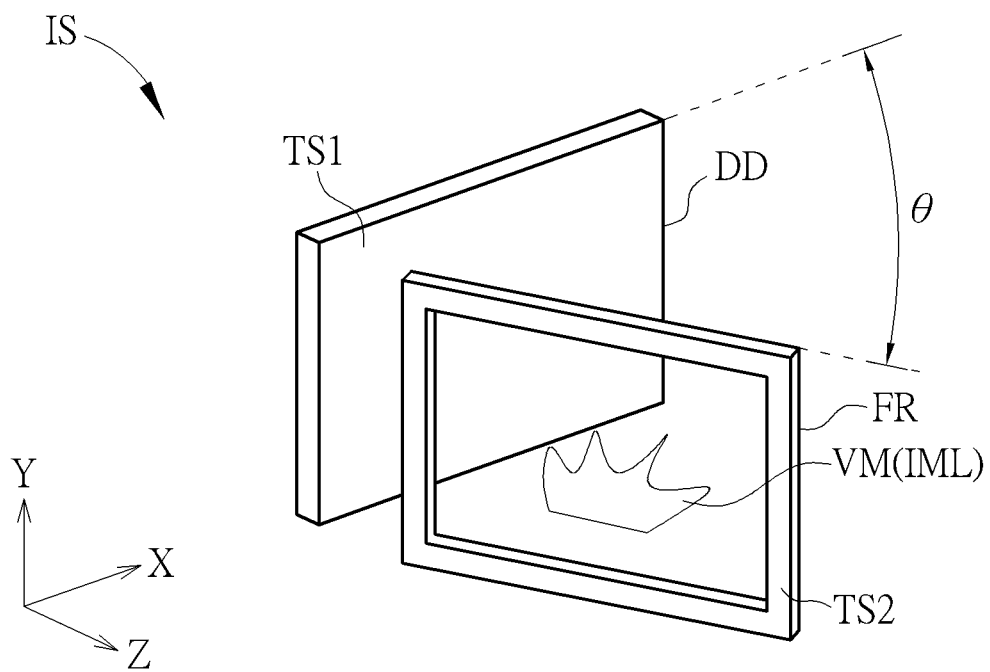
FIG. 6 schematically illustrates an exploded view of an image system according to a third embodiment of the present disclosure.

Referring to FIG. 5 and FIG. 6, FIG. 5 schematically illustrates an exploded view of an image system according to a second embodiment of the present disclosure, and FIG. 6 schematically illustrates an exploded view of an image system according to a third embodiment of the present disclosure. In order to simplify the figure, the display device DD is shown as a single layer in both FIG. 5 and FIG. 6, but not limited thereto. One of the differences between the image system IS shown in FIG. 1 and the image systems IS shown in FIG. 5 and FIG. 6 is the design of the frame FR. According to the present disclosure, the display device DD of the image system IS may for example display a floating image layer IML with a deformed shape (e.g. curved, tilted or wavy shape), and the frame FR of the image system IS may be designed to be deformed corresponding to the deformed floating image layer IML, but not limited thereto. It should be noted that "the frame FR is deformed corresponding to the deformed floating image layer IML" mentioned above represents that the shape of the frame FR may substantially be the same as or similar to the shape of the deformed floating image layer IML, but not limited thereto. For example, as shown in FIG. 5, the floating image layer IML displayed by the display device DD may for example have a curved shape in some embodiments, and the frame FR shown in FIG. 5 may be curved or have a curved shape corresponding to the floating image layer IML.

In addition, as shown in FIG. 6, the floating image layer IML displayed by the display device DD may for example be tilted in some embodiments, and the frame FR shown in FIG. 6 may be tilted corresponding to the floating image layer IML, wherein the tilted floating image layer IML and/or the tilted frame FR are not parallel to the extending direction (such as direction X) of the display device DD, and an included angle θ may be included between the display device DD and the frame FR, but not limited thereto. It should be noted that the shape of the frame FR mentioned above may represent the shape of the whole frame FR or the shape of the surface (such as the top surface TS2, but not limited thereto) of the frame FR, according to the design of the image system IS. That is, when the frame FR is said to be deformed corresponding to the deformed floating image layer IML, it may represent that the surface (such as the top surface TS2, but not limited thereto) of the frame FR includes the deformed shape or the whole frame FR includes the deformed shape, but not limited thereto. From the embodiments shown in FIG. 5 and FIG. 6, it can be known that because the frame FR may be designed to have the same deformed shape of the deformed floating image layer IML, the floating image layer IML may be substantially aligned with the top surface TS2 of the frame FR under the condition that the floating image layer IML is deformed. It should be noted that the deformed condition of the floating image layer IML and/or the frame FR of the present disclosure is not limited to what is shown in FIG. 5 and FIG. 6, and the frame FR of the present disclosure may have any suitable shape according to the deformed shape of the floating image layer IML. The relationship between the height H1 of the frame FR and the depth DH of the floating image layer IML may refer to the description mentioned above, and will not be redundantly described herein or in the following embodiments. For example, the depth DH of a portion of the floating image VM of the floating image layer IML may substantially align with the height H1 of the adjacent and corresponding portion of the frame FR, but not limited thereto. The deformed frame FR mentioned above may be applied to each of the embodiments of the present disclosure.

Figure 7:
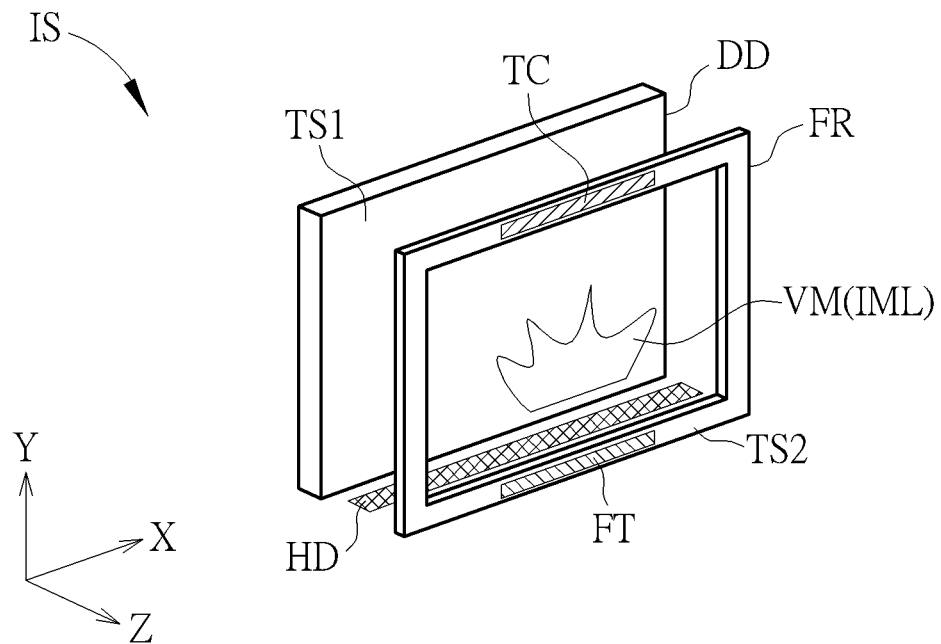
FIG. 7 schematically illustrates an exploded view of an image system according to a fourth embodiment of the present disclosure.

Referring to FIG. 7, FIG. 7 schematically illustrates an exploded view of an image system according to a fourth embodiment of the present disclosure. In order to simplify the figure, the display device DD is shown as a single layer in FIG. 7, but not limited thereto. According to the present embodiment, the image system IS may further include a floating touch sensor FT, a tracking camera system TC and a haptic device HD, but not limited thereto. In the present embodiment, the floating touch sensor FT may for example be arranged at the frame FR to receive the touch signal of the users, but not limited thereto. It should be noted that "the floating touch sensor FT is arranged at the frame FR" mentioned above means that the floating touch sensor FT may be disposed at any suitable position of the frame FR. For example, as shown in FIG. 7, the floating touch sensor FT may be disposed on the top surface TS2 of the frame FR, but not limited thereto. In some embodiments, the floating touch sensor FT may be disposed on other surface(s) of the frame FR, such as the inner surface of the frame FR. In some embodiments, the floating touch sensor FT may not be disposed on the surfaces of the frame FR, that is, the floating touch sensor FT and the frame FR may be separated. The floating touch sensor FT of the present embodiment may for example include an infrared sensor, a capacitive touch sensor, other suitable touch sensors or the combinations of the above-mentioned sensors, but not limited thereto. In the present embodiment, the floating touch sensor FT may be substantially aligned with the floating image layer IML, and the touch of the users may be detected by the floating touch sensor FT when the users are interacting with the displayed floating image VM, but not limited thereto. Because the image system IS of the present disclosure may include the frame FR, wherein the top surface TS2 of the frame FR may be substantially aligned with the floating image layer IML, the floating touch sensor FT disposed on the frame FR may thereby be substantially aligned with the floating image layer IML without further design, but not limited thereto. In some embodiments, the floating touch sensor FT may be disposed at any suitable position of the image system IS according to the demands of the design of the image system IS. In addition, because the image system IS of the present disclosure includes the frame FR having the top surface TS2 substantially aligned with the floating image layer IML, the frame FR may help the users to recognize the correct touch position of the floating image layer IML, thereby improving the user experience. The tracking camera system TC may be arranged at the frame FR, that is, the tracking camera system TC may be disposed on any suitable surface (such as the top surface TS2) of the frame FR, but not limited thereto. In some embodiments, the tracking camera system TC may be separated from the frame FR. The tracking camera system TC of the present embodiment may for example include an eye tracking camera, a head tracking camera, a face tracking camera, other suitable tracking cameras or the combinations of the above-mentioned tracking cameras, but not limited thereto. In the present embodiment, the tracking camera system TC may for example serve to give a wider viewing angle of the floating image layer IML, but not limited thereto. In detail, the visibility of the floating image layer IML observed by the user may be affected by the viewing angle of the user, that is, when the user observes the floating image layer IML in different viewing angles, the visibility of the image may be different. Therefore, the image system IS of the present disclosure may include the tracking camera system TC to track the motion of eyes, face or head of the user, thereby adjusting the displayed floating image VM, but not limited thereto. The haptic device HD may be disposed between the frame FR and the display device DD, but not limited thereto. In some embodiments, the haptic device HD may be disposed at any suitable position of the image system IS according to the demands of the design. In the present embodiment, the haptic device HD may serve to give a feedback when the user interacts with the floating image layer IML, thereby improving the user experience. For example, when the user touches the floating image layer IML, the touch signal may be transmitted to the haptic device HD, and the haptic device HD may send a feedback such as a vibration to the user, but not limited thereto. The feature that the image system IS includes the floating touch sensor FT, the tracking camera system TC and the haptic device HD mentioned above may be applied to each of the embodiments of the present disclosure individually or in combination.

Figure 8:
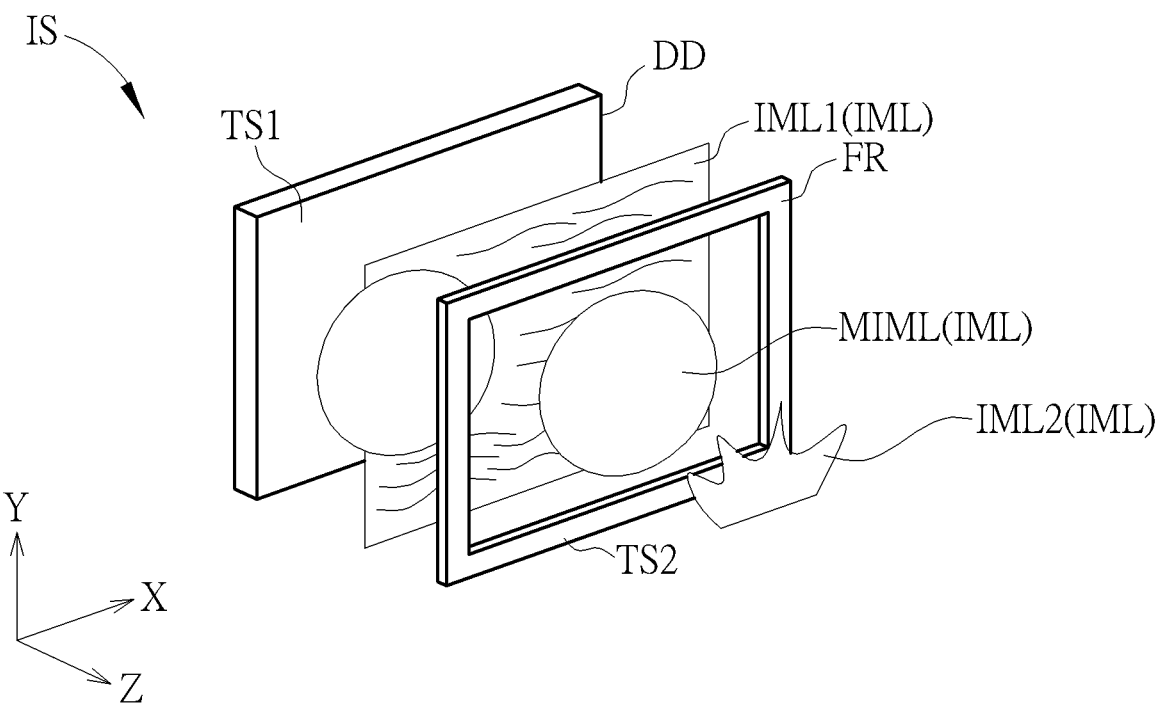
FIG. 8 schematically illustrates an exploded view of an image system according to a fifth embodiment of the present disclosure.
Figure 9:
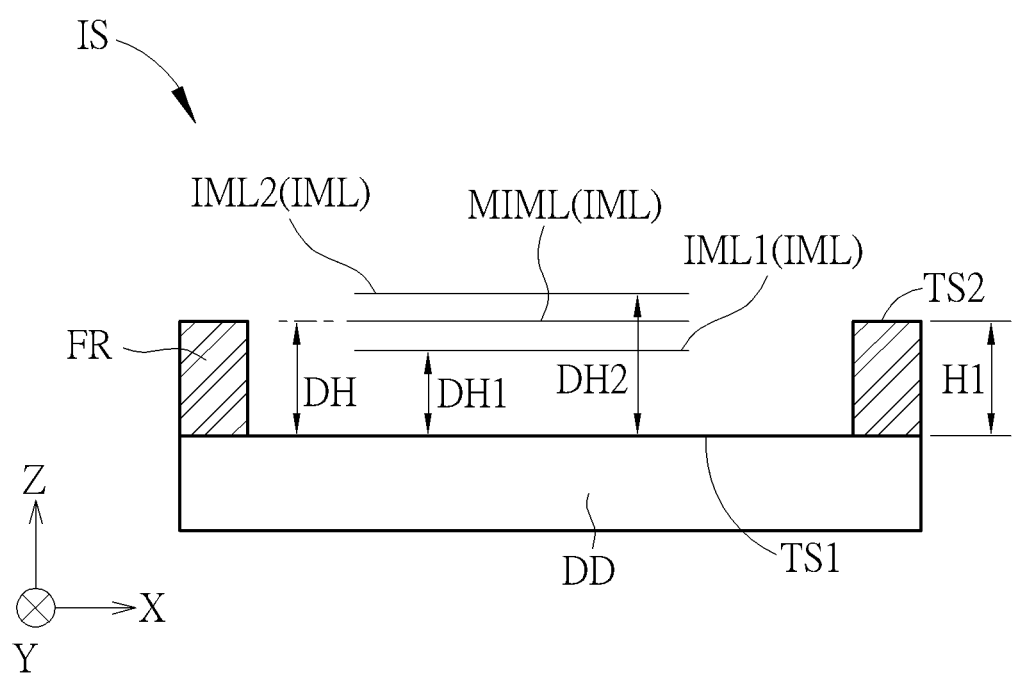
FIG. 9 schematically illustrates a cross-sectional view of the image system according to the fifth embodiment of the present disclosure.

Referring to FIG. 8 and FIG. 9, FIG. 8 schematically illustrates an exploded view of an image system according to a fifth embodiment of the present disclosure, and FIG. 9 schematically illustrates a cross-sectional view of the image system according to the fifth embodiment of the present disclosure. In order to simplify the figure, the display device DD is shown as a single layer in FIG. 8 and FIG. 9, but not limited thereto. According to the present embodiment, the image system IS may include the display device DD and the frame FR disposed on the display device DD, wherein the display device DD may for example display a plurality of floating image layers IML, but not limited thereto. In detail, as shown in FIG. 8, the display device DD of the image system IS may for example display a plurality of floating image layers IML, wherein the plurality of floating image layers IML may include a main floating image layer MIML, but not limited thereto. The main floating image layer MIML of the plurality of floating image layers IML may be determined according to the design and the use of the image system, for example, when the image system IS is applied to a vending machine, the floating image layer IML showing the icons of the products may be determined to be the main floating image layer MIML, but not limited thereto. According to the present embodiment, as shown in FIG. 9, the main floating image layer MIML may be substantially aligned with the top surface TS2 of the frame FR. That is, according to the above-mentioned description, the main floating image layer MIML may have a depth DH with reference to the top surface TS1 of the display device DD, and the depth DH of the main floating image layer MIML may range from 0.8 times to 1.2 times of the height H1 of the frame FR, but not limited thereto. The definition of the depth DH may refer to the contents mentioned above, and will not be redundantly described here. In some embodiments, the depth DH of the main floating image layer MIML may be equal to the height H1 of the frame FR, and the main floating image layer MIML can be said to be aligned with the top surface TS2 of the frame FR.

As shown in FIG. 9, the floating image layers IML may further include sub image layers (such as the sub image layer IML1 and the sub image layer IML2) in the present embodiment, wherein the sub image layers may be located above or below the main floating image layer MIML in the normal direction (such as the direction Z) of the top surface TS1 of the display device DD, and the present disclosure is not limited thereto. For example, as shown in FIG. 9, the sub image layer IML2 may for example be located above the main floating image layer MIML, which means farther from the display device DD than the main floating image layer MIML, and the sub image layer IML1 may for example be located below the main floating image layer MIML, which means closer to the display device DD than the main floating image layer MIML, but not limited thereto. Accordingly, the sub image layer IML1 may include a depth DH1 with reference to the top surface TS1 of the display device DD, and the sub image layer IML2 may include a depth DH2 with reference to the top surface TS1 of the display device DD, wherein the depth DH1 and the depth DH2 may be different from the depth DH of the main floating image layer MIML, but not limited thereto. In addition, as shown in FIG. 9, because the sub image layer IML1 may be located below the main floating image layer MIML, the depth DH1 of the sub image layer IML1 may for example be greater than 0 times and less than 1.2 times of the height H1 of the frame FR (that is, 0<DH1<1.2*H1), and because the sub image layer IML2 may be located above the main floating image layer MIML, the depth DH2 of the sub image layer IML2 may for example be greater than 0.8 times of the height H1 of the frame FR (that is, DH2>0.8*H1), but not limited thereto. It should be noted that the ranges of the depths of the floating image layers IML are not limited, and may be adjusted according to the design of the image system IS.

In addition, although the floating image layers IML shown in FIG. 8 and FIG. 9 include a flat shape, the present embodiment is not limited thereto. In some embodiments, each of the floating image layers IML (including the main floating image layer MIML, the sub image layer IML1 and the sub image layer IML2) may be curved (shown in FIG. 5), tilted (shown in FIG. 6) or include any suitable shape respectively, and the shapes of the floating image layers IML may be different. According to the present embodiment, the main floating image layer MIML may have any desired shape and form, and the frame FR may be applied to corresponding to the shape and form of the main floating image layer MIML, but not limited thereto. For example, when the main floating image layer MIML is curved, the sub image layer IML1 is tilted, and the sub image layer IML2 is flat, the frame FR may have the curved form corresponding to the curved main floating image layer MIML; when the main floating image layer MIML is tilted, the sub image layer IML1 is flat, and the sub image layer IML2 is curved, the frame FR may have a tilted form corresponding to the tilted main floating image layer MIML, but not limited thereto.

In addition, although it is not shown in FIG. 8 and FIG. 9, the image system IS of the present embodiment may further include the floating touch sensor FT, the tracking camera system TC and/or the haptic device HD mentioned above, but not limited thereto. The description of the floating touch sensor FT, the tracking camera system TC and the haptic device HD may refer to the contents mentioned above, and will not be redundantly described here.

In summary, the image system including the display device capable of displaying the floating image layer and the frame disposed on the display device is provided by the present disclosure, wherein the height of the frame and the depth of the floating image layer may be designed, such that the floating image layer may be substantially aligned with the top surface of the frame. Therefore, the frame may help the users to recognize the position of the floating image layer, such that the three dimensional effect of the floating image layer observed by the users may be improved by the frame. The visibility of the floating image may be improved, thereby improving the viewing experience of the users.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An image system, comprising:
   a display device displaying at least one floating image layer on a top surface of the display device; and
   a frame disposed on the display device and partially overlapping the display device, the frame having an opening partially exposing the top surface of the display device,
   wherein a first distance is from the top surface of the display device to the at least one floating image layer, a second distance is from the top surface of the display device to a top surface of the frame, and the first distance is equal to the second distance.

2. The image system of claim 1, wherein the display device comprises:
   a display panel; and
   an optical component disposed on the display panel.

3. The image system of claim 2, wherein the display panel comprises a light emitting diode display panel or a liquid crystal display panel.

4. The image system of claim 2, wherein the optical component comprises lenticular lens, parallax barrier, liquid crystal gradient index (GRIN) lens or liquid crystal parallax barrier.

5. The image system of claim 1, wherein the at least one floating image layer is a curved floating image layer and has a curved shape, and the frame is curved and has the curved shape.

6. The image system of claim 1, wherein the at least one floating image layer is a tilted floating image layer, the frame is tilted corresponding to the tilted floating image layer, and the top surface of the frame is parallel to the tilt floating image layer.

7. The image system of claim 1, further comprising:
   a floating touch sensor, and at least a portion of the floating touch sensor is aligned with the at least one floating image layer in the direction parallel to the height direction of the frame.

8. The image system of claim 7, wherein the floating touch sensor comprises an infrared sensor or a capacitive touch sensor.

9. The image system of claim 1, further comprising a tracking camera system electrically connected to the display device.

10. The image system of claim 9, wherein the tracking camera system comprises an eye tracking camera, a head tracking camera or a face tracking camera.

11. The image system of claim 1, further comprising a haptic device disposed between the frame and the display device.

12. The image system of claim 1, wherein the at least one floating image layer further comprises a first sub image layer having a first depth with reference to the top surface of the display device, and the first depth is different from a depth of the at least one floating image layer with reference to the top surface of the display device.

13. The image system of claim 12, wherein the first depth is less than 1.2 times and greater than 0 times of the height of the frame.

14. The image system of claim 12, wherein the at least one floating image layer further comprises a second sub image layer having a second depth with reference to the top surface of the display device, and the second depth is different from the depth of the at least one floating image layer with reference to the top surface of the display device.

15. The image system of claim 14, wherein the second depth is greater than 0.8 times of the height of the frame.

* * * * *